Nov. 17, 1964 G. L. GRIFFITH ET AL Re. 25,685

DETONATABLE CARTRIDGES HAVING INSENSITIVE EXPLOSIVE CORES

Original Filed Jan. 5, 1960 2 Sheets-Sheet 1

INVENTORS
GEORGE L. GRIFFITH
GEORGE A. LYTE
BY FRANKLIN B. WELLS
Eyre, Mann + Lucas
ATTORNEYS

DETONATABLE CARTRIDGES HAVING INSENSITIVE EXPLOSIVE CORES

Original Filed Jan. 5, 1960 2 Sheets-Sheet 2

INVENTORS
GEORGE L. GRIFFITH
GEORGE A. LYTE
BY FRANKLIN B. WELLS
Eyre, Mann & Lucas
ATTORNEYS United States Patent Office Re. 25,685
Reissued Nov. 17, 1964

25,685

DETONATABLE CARTRIDGES HAVING INSENSITIVE EXPLOSIVE CORES

George L. Griffith, Coopersburg, and George A. Lyte, Bethlehem, Pa., and Franklin B. Wells, Wharton, N.J., assignors to Trojan Powder Company, a corporation of New York Original No. 3,082,689, dated Mar. 26, 1963, Ser. No. 615, Jan. 5, 1960. Application for reissue Feb. 6, 1964, Ser. No. 354,191
12 Claims. (Cl. 102—24)

Matter enclosed in heavy brackets [ ] appears in the original patent but forms no part of this reissue specification; matter printed in italics indicates the additions made by reissue.

This invention relates to a method for detonating normally insensitive, i.e., nondetonatable explosive compositions and to explosive cartridges which ensure such detonation, even though the explosives are not under confinement. More particularly, the invention relates to a method of detonating normally insensitive or nondetonatable nitrate-based explosives by surrounding a core of such explosive with a sensitive or detonatable explosive composition, and to explosive cartridges comprising a core tube containing the insensitive nitrate-based explosive composition surrounded by an outer shell of the sensitive explosive composition.

Alkali metal and alkaline earth metal and other metal nitrates in the form of cast compositions containing such nitrates as the sole explosive material or in admixture with ammonum nitrate in a proportion of 80% or in excess of about 80% cannot be detonated in the standard manner. These nitrates are classified as nondetonatable when in cast form. Ammonium nitrate is detonatable, however, under favorable conditions, and is classified as a difficultly detonatable explosive. For this reason, nitrate-based explosives have required a sufficiently high proportion of ammonium nitrate to ensure detonation. Even ammonium nitrate cannot always be detonated by ordinary methods, however, when it is packed to a high density, in excess of about 1.15, unless the explosive is under high confinement, that is, held under such conditions that it must do considerable work to burst out.

Inasmuch as many nitrates, such as sodium nitrate, are less expensive than ammonium nitrate, it is nonetheless advantageous to employ these nitrates in as large amounts as can be tolerated without losing detonatability. They have been used in fuel-containing explosives in substitution for a portion of the ammonium nitrate to supply the oxygen needed to balance the mixture. Sodium nitrate supplies more oxygen per gram than does ammonium nitrate, so that its use makes it possible to keep down the weight of nitrate in the mix. It has not been possible to replace more than a minor proportion of the ammonium nitrate in this way, however, because of the nondetonating characteristics of the other nitrate. Since the decomposition of sodium nitrate is endothermic, the use of cores of sodium nitrate or compositions containing it provides a relatively cool explosive in its overall effect. This is of particular importance in underground shooting where inflammable dust or gas may be present.

Nitrates are commonly used in a variety of black powder compositions, but such compositions, as is well known, are balanced to produce carbon monoxide and obtain rapid burning. Such compositions do not detonate but merely deflagrate.

In accordance with the invention, a method is provided whereby nondetonatable nitrate-based explosive compositions can be detonated. The nitrate-based explosive in its core tube is surrounded at least on its sides, or embedded in, or enclosed by, a sensitive explosive composition which is itself capable of being detonated by a blasting cap or booster charge. The sensitive explosive then is detonated. Detonation of the sensitive explosive detonates the insensitive explosive surrounded thereby. Surprisingly, if the sensitive explosive be surrounded by the insensitive nitrate explosive, and the sensitive explosive detonated, the latter does not detonate as effectively.

The method of the invention is best carried out in a cored explosive cartridge, in which the insensitive nitrate explosive is packed in a core tube which is centrally positioned in the cartridge, and the sensitive explosive is then packed in the shell surrounding the core. The cartridge is of light weight resilient construction, so as not to put the contents under confinement. The cartridges of this invention may be made up of multiple alternate layers of insensitive and sensitive material, providing that the core always consists of the insensitive material, and that the outermost layer always consists of the sensitive material, and this variation, which is illustrated below in Example 14, is to be considered as an embodiment of this invention.

By "nondetonatable" or "insensitive," as these terms are used in the specification and claims, it is meant that the nitrate-base explosive cannot be detonated by ordinary means well known to those skilled in the art. Two detonation tests are used. These are as follows:

Test No. 1.—The nitrate-based explosive is filled into a standard 3 inch cartridge, and detonation attempted with a ½ lb. Pentolite booster. If detonation is not obtained, successively larger charges and boosters are used, the cartridges ranging to 8 inches maximum, and the boosters ranging to 2 lbs. maximum. If the composition is nondetonatable in an 8 inch cartridge by a 2 lb. booster, the next stage of this test is used.

Test No. 2.—The nitrate-based explosive is filled into a 5 inch x 25 inch shell, and this is put in a 5 inch metal pipe with the end abutting against a 5 inch x 25 inch shell filled with 40% ammonia dynamite, which is detonated using a blasting cap of the fusion or electric type. If detonation does not occur, 70% ammonia dynamite is used, followed successively by the use of 1 and 2 lb. cast Pentolite boosters. In lieu of a 5 inch pipe, a 5 inch diameter bore hole in rock can be employed.

If the explosive cannot be detonated by either of these tests, it is "nondetonatable" or "insensitive," in the meaning of the specification and claims. "Sensitive," on the other hand, means that the explosive is detonatable, initiated by any conventional means, such as a blasting cap or a booster charge.

The term "nitrate-based explosive" is used generically to refer to 100% nitrate explosives as well as compositions containing a nitrate as a principal explosive with other supplemental ingredients such as fuels.

The relative amounts of the core explosive and of the sensitive explosive shell are significant. For each type of core explosive, and a specified weight of the core, there is a minimum weight of sensitive explosive per unit length of the cartridge required for detonation.

The ratio R of these weights can be expressed mathematically as follows:

$$R=\frac{\text{weight of sensitive explosive}}{\text{weight of insensitive explosive}}$$

Thus, for each core explosive and core dimension, there is a minimum ratio R below which detonation will not occur. In meeting these requirements, R ordinarily has a minimum value of from about 0.2 to about 1.8. The lower value of R, the more economical the cartridge is, because of the lesser amount of the sensitive explosive required, and therefore cartridges are usually designed to R values approaching the minimum, or up to about 0.5 unit above the minimum.

The drawings show in cross section three types of cored explosive cartridges for use in carrying out the method of the invention.

Figure 1:
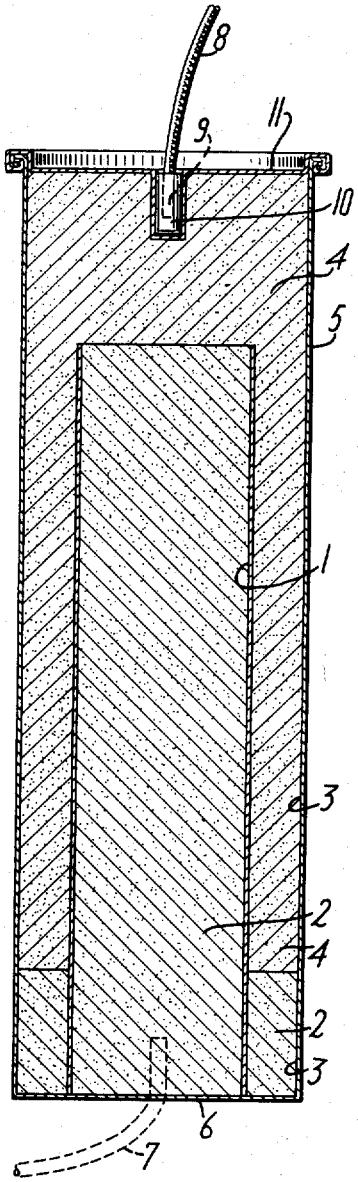
FIGURE 1 shows in cross section a cored explosive cartridge of the form employed in the tests described in the examples which follow.

The cored explosive cartridge of FIGURE 1 comprises a tubular core portion 1 filled with the insensitive nitrate explosive 2. The core is loosely placed in the shell 3 of the cartridge, and the space between the core and the shell filled with the sensitive explosive 4. As shown, the portion 5 at the top of the container is also filled with the sensitive explosive.

The test units contain a layer of insensitive core explosive 2 at the bottom of the outer shell surrounding the core to ensure that the telltale would not be detonated by the sensitive powder 4 in the shell. In the commercial embodiment of this cartridge, however, this is not done and the shell is completely filled with the sensitive powder. For test purposes, a telltale 7 is inserted at the bottom end 6 of the container, to show whether detonation had occurred at the bottom of the container. The telltale is shown by dotted lines, because it is not a part of the commercial assembly but only of the test assembly.

The cored explosive cartridge of FIGURE 1 is fired by a blasting cap 10 which is inserted in a well of the recessed container top 11 projecting into the upper portion 5 of the sensitive explosive. A fuse 8 is inserted in the top 9 of the blasting cap.

Figure 2:
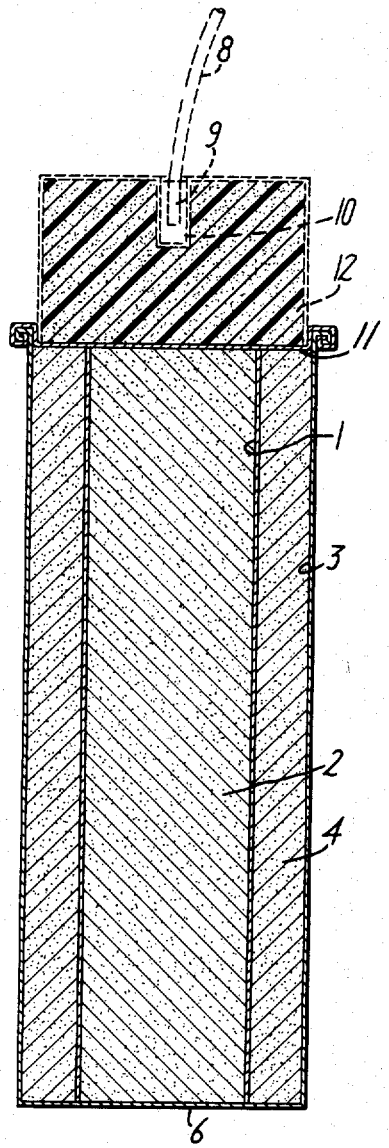
FIGURE 2 shows in cross section another form of cored explosive cartridge, designed to be detonated by a booster, shown in position at the top of the cartridge.

The cored explosive cartridge of FIGURE 2 is intended to be used in a series which can be placed end to end to form an explosive train. In this type, the core is run to the top so that the explosive shock can be transmitted from cartridge to cartridge in the train, and the end cartridge in the train is fitted with a booster. As in the cartridge of FIGURE 1, the core portion 1 contains the insensitive nitrate base explosive 2, and the shell 3 contains the sensitive explosive 4. The booster is fitted in the top 11 of the cartridge. The booster is filled with a booster explosive 12, and inserted in a well in the top of the booster is a blasting cap 10, in the top 9 of which is inserted the fuse 8.

This type of cartridge as shown is the commercial embodiment, and this is the type of cartridge employed in Example 33.

The cartridge cases are conventional in all respects. They may be of metal, plastic, paper of the convolute or spiral wound, crimped, and wax-sealed type, or of any other material which is suitable.

Inorganic metal nitrates as a class can be employed as the insensitive nitrate-based explosive. The alkali metal and alkaline earth metal nitrates are available, and inexpensive. Lead nitrate, cadmium nitrate and copper nitrate also can be used. Most metal nitrates exist as hydrates under normal atmospheric conditions, and it is preferable to use a nitrate not greatly hydrated, and not hygroscopic. These nitrates may constitute 100% of the insensitive explosive; such nitrates are readily detonated in the cartridges of the invention.

The nitrates can with advantage be blended with fuels such as carbonaceous materials, for example, bituminous coal, anthracite coal, charcoal, mineral oils, carbon black, lamp black, bagasse, nut and wood flours and meals and starch. Rosin and metallic resinates, hexamethylene tetramine and paraffin waxes also can be included in small amounts. Finely divided metals such as aluminum, iron and ferrosilicon also are useful. Sulfur can be used as well.

Preferably, the fuel should be present in a proportion sufficient for oxygen balance. This will in general be within the range of about 5–10% and depends upon the nitrate and the fuel used.

Stabilizers such as calcium carbonate, magnesium oxide and like inorganic salts, as well as basic organic compounds such as amines, which are well known to those skilled in the art, can also be incorporated. Such materials would usually be used in an amount up to about 0.5%.

Ammonium nitrate explosive compositions become non-detonatable if they are desensitized by water, such as may be absorbed during storage or if the cartridges are wet for any reason, and also if their packing density increases beyond a limiting high density, which varies with the physical state of subdivision of the ammonium nitrate and with the amount and kind of carbonaceous material or fuel, if any, that is present. For example, mill ammonium nitrate is substantially nondetonatable at a density of about 1.15 or higher, even if the diameter of the column is greater than 5 inches. In columns less than 5 inches mill ammonium nitrate at a density of about 0.95 cannot be detonated except under heavy confinement. Under the same conditions uncoated prilled ammonium nitrate with a density of 0.8 or slightly higher and coarse Stengel ammonium nitrate having a density of about 0.9 behave similarly. Ammonium nitrate explosives containing carbonaceous material or fuels usually do not become insensitive until densities of 1.15 are reached, but these limits again may vary somewhat, depending upon the physical state of subdivision of the ammonium nitrate and the particular ingredients present.

The process of the invention and the explosive cartridges thereof can be used to detonate ammonium nitrate-based explosives which because of their high density, or because of densitization with water, are rendered nondetonatable. Such compositions can be composed wholly or partially of ammonium nitrate, in admixture with other nitrates and/or fuels in the conventional proportions required for detonation.

It is interesting to note that while normally detonatable ammonium nitrate compositions can be detonated in accordance with the invention, this offers no advantage over ordinary detonation methods such as are exemplified in Tests 1 and 2.

The particle size of the nitrate can be adjusted to meet the need. Ordinary commercial mill nitrate is perfectly satisfactory. So also are prilled nitrate and Stengel nitrate (molten nitrate cast on a backing sheet in a ribbon and broken up). In some cases, coarse nitrate having a grain size passing a standard No. 6 sieve and held on a standard No. 10 sieve is desirable.

The nitrate-based explosive composition is readily prepared by dry mixing the ingredients. The dry mix can be loaded by any means, such as screw loading or cast from a slurry in molten nitrate which is loaded into a tube of the desired diameter and length, which serves as a core for the cartridge, and is inserted in the cartridge shell before the latter is loaded with the sensitive explosive.

The cartridge shell and core tube can be made of any lightweight, self-sustaining, resilient, structurally weak material. Cardboard and paper cartridges are quite satisfactory. So also are cartridges of low tensile strength synthetic resins and cellulose derivatives such as ethyl cellulose and polyethylene. The core can be a tube which is merely inserted in the container shell, or which is fixed to the bottom of the shell.

The core is filled with the insensitive explosive material to the desired density. The density is in no way critical, and the wide range of possible densities is illustrated in the examples.

The outer shell is filled with sensitive explosive powder in any conventional way, such as by bumper loading. If the core does not run all the way to the top of the shell, the space from the top of the core of the shell can also be filled with sensitive powder, and this will serve as a booster for the entire assembly. However, the booster can be different from the sensitive powder if desired.

The dimensions of the core and shell are determined by the value of R required for detonation. This value in turn depends upon the relative insensitivity of the core explosive and the brisance of the sensitive explosive. An important advantage of the invention is the ability of obtaining detonation using cores as low as 1.5 inches in diameter and shells lower than 5 inches in diameter. Cores ranging from 2 to 6.5 inches in diameter can be used with shells ranging from 3 to 8 inches in diameter.

The length of the cartridge is determined by the magnitude of the explosive force required for the work at hand, and is not significant. The R value is independent of length.

As the sensitive explosive in the outershell, there can be used any detonatable explosive material of the brisance required for detonation of the core. Explosives such as ammonia dynamite, nitroglycerin, nitroglycerin dynamites, semi-gelatin, and gelatin dynamites, composition B (a mixture of 60% cyclotrimethylene trinitramine, 40% trinitrotoluene and from 1 to 4% wax), trinitrotoluene and other nitrotoluenes, nitronaphthalenes, pentaerythritol tetranitrate, Pentolite (a mixture of 1:1 pentaerythritol tetranitrate and trinitrotoluene) and Cyclonite (RDX, cyclotrimethylenetrinitramine), are all satisfactory. Many others will be apparent to those skilled in the art from this description.

The sensitive explosive may also contain fuels, sensitizers, supplemental explosives, etc., as may be desired.

The amount of the sensitive explosive is determined by the R value.

The minimum R value is best ascertained for any given nitrate-based core explosive and sensitive explosive combination by trial and error. The working examples which follow give a good starting point for such experimentation, and suggest limiting R values for a great variety of core and shell explosive compositions in a wide range of cartridge sizes. If detonation is not obtained in the first trial, this means that the R value is low, and a sensitive explosive of greater brisance or a larger shell dimension is next tried, and this repeated until detonation is obtained.

The finished cartridge is detonated by firing the sensitive explosive. This can be done by a blasting cap, of the fusion or electric type, or a booster charge if the explosive is too insensitive to be fired by a cap. Preferably the shell explosive is cap-sensitive.

In the firing tests, the results of which are described in the examples which follow, the explosive cartridges were prepared as follows:

(1) The inner core of the cartridge was from 3 to 4 inches shorter than the outer shell.

(2) The inner core was filled with the metal nitrate, preferably screw-loaded and centered in the outer shell.

(3) The insensitive core explosive was tamped in place at the bottom of the outer shell, to such a depth that its upper surface was 2 inches above the bottom (this was done to insure that the telltale would not be detonated by the sensitive powder in the shell, and is not otherwise done).

(4) The outer shell was then filled with the sensitive powder by bumper-loading. The 3 to 4 inch space at the top of the core was also filled with the sensitive powder, to serve as a booster for the explosive assembly. In a few cases (where indicated), tests were made with assemblies where the inner core and outer shell were the same height, and a cast Pentolite booster was attached at the top end of the explosive cartridge, but no difference was noted in exploding these two types of cartridges.

(5) A primacord telltale was inserted at the bottom 1 inch below the lower surface of the sensitive powder in the outer shell.

(6) The assembly was initiated by a standard blasting cap, and the firing or nonfiring of the telltale noted.

The telltale used was pentaerythritol tetranitrate, in an amount of 50 grains per foot, with a rubber-like core surrounded by a woven fabric. This telltale detonates at a high velocity, of the order of 6500 to 7000 meters per second.

If the telltale detonated, the results are indicated in the tabulations below by a + sign, and if the telltale did not detonate, by a — sign.

All dimensions of the cartridge core and shell are in inches.

The following examples represent in the opinion of the inventors the best embodiments of the invention.

EXAMPLE 1

The nitrate in the core used in this cartridge was 100% mill sodium nitrate. The sensitive explosive used in the outer shell was a standard cap sensitive ammonia dynamite having a rate of detonation of 3548 m./sec. in 1.25 inch×8 inch sticks at a density of 1.26, and a rate of 2840 m./sec. in 1.25 inch×8 inch sticks at a density of 1.01, and a ballistic pendulum value of 9, and commonly is designated as a 40% dynamite.

The nitrate and cap sensitive ammonia dynamite combination was tested in a variety of cartridges having core diameters ranging from 2 to 6.5 inches, and outer shell diameters ranging from 3 to 8 inches. The average density of the core material was 1.56 and that of the cap sensitive explosive 1.01. The volume ratio r of the cross sectional area of the outer shell and that of the core was obtained by dividing the cross sectional area of the space between the core and the outer shell by the cross sectional area of the core. The ratio R of sensitive explosive to sodium nitrate by weight per unit of length of the assembly was obtained by dividing the weight of sensitive explosive per unit length by the weight of core material per unit length.

The following results were obtained for the cartridges tested.

Table I

| No. | Core | Shell | d | r | R | Results |
|---|---|---|---|---|---|---|
| a | 2 | 3 | 1.56 | 1.25 | 0.81 | — |
| b | 2 | 3.5 | 1.56 | 1.63 | 1.34 | + |
| c | 4 | 5.5 | 1.56 | 0.91 | 0.59 | — |
| d | 4 | 6 | 1.56 | 1.25 | 0.81 | + |
| e | 5 | 6 | 1.56 | 0.44 | 0.28 | — |
| f | 5 | 6.5 | 1.56 | 0.69 | 0.45 | + |
| g | 6.5 | 8 | 1.56 | 0.52 | 0.34 | — |
| h | 6 | 8 | 1.56 | 0.78 | 0.50 | + |

Detonation was obtained where the ratio of sensitive explosive to core material R was sufficiently high. The larger the core, the lower the value of R at which the cartridge detonated, showing that a smaller proportion of sensitive explosive sufficed to detonate the insensitive core in such cases.

EXAMPLE 2

The insensitive core material in this example was a mixture of 85% mill sodium nitrate and 15% ground anthracite coal. The sensitive explosive used was the standard 40% ammonia dynamite of Example 1.

The assemblies were prepared with a variety of cores, ranging from 1.5 to 6.5 inches in diameter, and a variety of shells ranging from 2.25 to 8 inches in diameter. The core composition was packed to an average density of 1.38 in all cases. The results obtained for the assemblies tested appear in table below:

Table II

[Standard size shells]

| No. | Core | Shell | d | r | R | Results |
|---|---|---|---|---|---|---|
| a | 1.5 | 2.25 | 1.38 | 1.25 | 0.90 | − |
| b | 1.5 | 2.5 | 1.38 | 1.78 | 1.30 | + |
| c | 2 | 3 | 1.38 | 1.25 | 0.91 | − |
| d | 2 | 3.25 | 1.38 | 1.63 | 1.19 | + |
| e | 3 | 4 | 1.38 | 0.78 | 0.57 | − |
| f | 3 | 4.5 | 1.38 | 1.25 | 0.91 | + |
| g | 5 | 6 | 1.38 | 0.44 | 0.32 | − |
| h | 5 | 6.5 | 1.38 | 0.69 | 0.50 | + |
| i | 6.5 | 8 | 1.38 | 0.52 | 0.38 | − |
| j | 6 | 8 | 1.38 | 0.78 | 0.57 | + |

Here again, it is apparent that detonation was obtained in each case where the value of R was sufficiently high, and that detonation could be obtained at lower R values as the cores and shells increase in size.

EXAMPLE 3

Another group of explosive assemblies was prepared, using the insensitive explosive composition of Example 2 and, as the sensitive explosive, an ammonia dynamite having a rate of detonation of 4049 m./sec. in 1.25 inch x 8 inch sticks at a density of 1.13, and a rate of 3397 m./sec. in 1.25 x 8 inch sticks at a density of 0.980, and a ballistic pendulum value of 12.2, commonly designated as a standard 70% dynamite. The core explosive was packed to a density of 1.38, and the cap sensitive explosive to an average density of 0.987. The cores used had a diameter of 3 inches and the shells 3.5 inches or 4 inches. The folowing results were obtained:

Table III

| No. | Core | Shell | d | r | R | Results |
|---|---|---|---|---|---|---|
| a | 3 | 3.5 | 1.38 | 0.37 | 0.26 | − |
| b | 3 | 4 | 1.38 | 0.78 | 0.56 | + |

It is apparent from a comparison of this data with Example 2 that the more brisant explosive was a better initiator for this insensitive explosive composition.

EXAMPLE 4

The insensitive core composition of this example was a mixture of 85% mill sodium nitrate and 15% powdered bituminous coal. The cap sensitive explosive used in the shell was the 40% ammonia dynamite of Example 1. The assemblies employed cores 3 inches in diameter and shells of 3.5 or 4 inches in diameter. The core explosive was packed to an average density of 1.5. The following results were obtained:

Table IV

| No. | Core | Shell | d | r | R | Results |
|---|---|---|---|---|---|---|
| a | 3 | 3.5 | 1.5 | 0.37 | 0.25 | − |
| b | 3 | 4 | 1.5 | 0.78 | 0.52 | + |

Again, it is apparent that detonation was obtained at quite a low R ratio. In contrast, the core material could not be detonated in a 5 inch pipe by a 2 lb. cast Pentolite booster.

EXAMPLE 5

Example 4 was repeated, substituting charcoal for the bituminous coal in the core material, with the following results:

Table V

| No. | Core | Shell | d | r | R | Results |
|---|---|---|---|---|---|---|
| a | 3 | 3.5 | 1.5 | 0.37 | 0.25 | − |
| b | 3 | 4 | 1.5 | 0.78 | 0.52 | + |

In contrast, the core material could not be detonated in a 5 inch pipe by a 2 lb. cast Pentolite booster.

EXAMPLE 6

In this example, the insensitive core explosive was a mixture of 87% mill potassium nitrate and 13% ground anthracite coal. The cap sensitive ammonia dynamite was the 40% material of Example 1. The cores used were 3 inches in diameter, and the shells were 4 inches or 4.5 inches in diameter. The core was packed to a density of 1.105. The following results were obtained:

Table VI

| No. | Core | Shell | d | r | R | Results |
|---|---|---|---|---|---|---|
| a | 3 | 4 | 1.105 | 0.78 | 0.71 | − |
| b | 3 | 4.5 | 1.105 | 1.25 | 1.15 | + |

In this case, a somewhat higher ratio of sensitive powder to core material was required, showing that the potassium nitrate is slightly more difficult to detonate than the sodium nitrate. The data here should be compared with the data in Examples 2(e) and (f).

EXAMPLE 7

In this example, granular strontium nitrate was used in an amount of 90.5% with 9.5% anthracite coal as the insensitive explosive. The cap sensitive ammonia dynamite was the 40% ammonia dynamite of Example 1. The core was packed to a density of 1.85 in cores 3 inches in diameter, using shells 5 or 5.5 inches in diameter. The following results were obtained:

Table VII

| No. | Core | Shell | d | r | R | Results |
|---|---|---|---|---|---|---|
| a | 3 | 5 | 1.85 | 1.78 | 0.97 | − |
| b | 3 | 5.5 | 1.85 | 2.4 | 1.31 | + |

The data suggests that the strontium nitrate is somewhat less sensitive to detonation than potassium nitrate. However, good results were obtained at a satisfactory R ratio. In contrast, the core material could not be detonated in a 5 inch pipe by means of a 5 inch x 10 inch cartridge of 70% ammonia dynamite.

EXAMPLE 8

This example illustrates the use of granular barium nitrate, which was used in an amount of 89.7% with 10.3% anthracite coal as the insensitive core explosive. This was used with the 40% ammonia dynamite of Example 1 as the cap sensitive shell material. Cores 3 inches in diameter with shells 4.5 or 5 inches in diameter were used. The density of the core material was 2.54. Detonation was obtained at a quite satisfactory R ratio, even better than that of Example 2.

Table VIII

| No. | Core | Shell | d | r | R | Results |
|---|---|---|---|---|---|---|
| a | 3 | 4.5 | 2.54 | 1.25 | 0.49 | − |
| b | 3 | 5 | 2.54 | 1.78 | 0.71 | + |

In contrast, the core material could not be detonated in a 5 inch pipe by means of a 5 inch x 10 inch cartridge of 70% ammonia dynamite.

EXAMPLE 9

Example 8 was repeated using the 70% ammonia dynamite of Example 3 in the shell, with the following results:

Table IX

| No. | Core | Shell | d | r | R | Results |
|---|---|---|---|---|---|---|
| a | 3 | 4 | 2.54 | 0.78 | 0.30 | − |
| b | 3 | 4.5 | 2.54 | 1.25 | 0.39 | + |

Again, the more brisant powder gives detonation at a lower R ratio.

EXAMPLE 10

Example 8 was repeated, substituting cast Pentolite having a density of 1.65 and a rate of 7407 m./sec. for the 40% ammonia dynamite in shells having a smaller diameter, 3.5 or 4 inches. The following results were obtained:

Table X

| No. | Core | Shell | d | r | R | Results |
|---|---|---|---|---|---|---|
| a | 3 | 3.5 | 2.54 | 0.37 | 0.24 | − |
| b | 3 | 4 | 2.54 | 0.78 | 0.50 | + |

As in previous examples, a thinner shell of the more brisant explosive is required for detonation. The above composition could not be detonated even with a 2 lb. cast Pentolite booster, when under confiement in a 5 inch steel pipe.

Examples 8, 9 and 10 taken together show that for very low detonation rate shell explosives, such as 20% ammonia dynamite, a relatively large amount would be required, while with shell explosives having a high detonation rate, such as cast Pentolite, composition B and similar materials, a relatively small amount will suffice for the same quantity of insensitive core material.

EXAMPLE 11

A core explosive was made up composed of 85% mill sodium nitrate, 5% No. 5 mineral oil (viscosity 100 SSU at 100° F.) and 9% bituminous coal. This material was filled into cores 3 inches in diameter, using shells of 3.5 to 4.5 inches in diameter, with the 40% ammonia dynamite of Example 1. The following results were obtained:

Table XI

| No. | Core | Shell | d | r | R | Results |
|---|---|---|---|---|---|---|
| a | 3 | 3.5 | 1.6 | 0.37 | 0.23 | − |
| b | 3 | 4 | 1.6 | 0.78 | 0.49 | + |
| c | 3 | 4.5 | 1.6 | 1.25 | 0.79 | + |

In Example (b), while all shots appeared to fire completely, there was only 40% firing of the telltale, so that the 4.5 inch shell was tested as a check.

These results are to be compared with Example 4. This material failed to detonate when initiated with a 2 lb. cast Pentolite booster in a 4 inch pipe.

EXAMPLE 12

A core material was made up containing 86.6% sodium nitrate, 5% bituminous coal, and 0.4% Cab-o-sil, and 8% of No. 5 mineral oil was added thereto. The Cab-o-sil, a colloidal silica produced by sublimation of silicon tetrachloride, gels the oil and thus keeps it from segregating. This was used with the 40% ammonia dynamite of Example 1 as the sensitive explosive in the outer shell with the following results:

Table XII

| No. | Core | Shell | d | r | R | Results |
|---|---|---|---|---|---|---|
| a | 3 | 3.5 | 1.55 | 0.37 | 0.23 | − |
| b | 3 | 4 | 1.55 | 0.78 | 0.51 | + |

These results compare very closely with those of Example 11, as does the cratering test shown in Table XXXIV.

EXAMPLE 13

A core material was made up containing 87.3% sodium nitrate and 0.63% Cab-o-sil to which was added 12% No. 5 mineral oil. This was used as the core material with the 40% ammonia dynamite of Example 1 in the outer shell with the following results:

Table XIII

| No. | Core | Shell | d | r | R | Results |
|---|---|---|---|---|---|---|
| a | 3 | 3.5 | 1.52 | 0.37 | 0.24 | − |
| b | 3 | 4 | 1.52 | 0.78 | 0.52 | + |

These results compare very closely with those of Examples 11 and 12 above, but the cratering test shown in Table XXXIV indicates that the power, when the fuel is all oil, is very poor. The results of Example 12 indicate that such is not due to the presence of Cab-o-sil.

EXAMPLE 14

Figure 3:
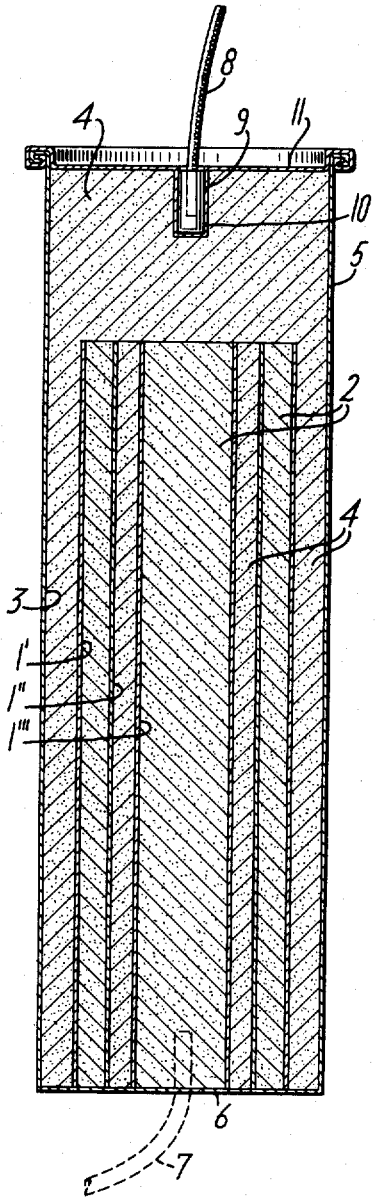
FIGURE 3 shows the multiple cored explosive cartridge described more fully in Example 14.

The core material of Example 1 was employed to prepare a multiple core cartridge of the type shown in FIGURE 3. First, a 1.75 inch x 12 inch core (1''' in FIGURE 3) was filled with the insensitive explosive (2 of FIGURE 3) of Example 1. This was centered in a 2.5 inch x 12 inch tube (1'' in FIGURE 3), and the annular space thus formed filled with the 40% ammonia dynamite of Example 1 (4 in FIGURE 3). This assembly was then centered in a 3.5 inch x 12 inch tube (1' in FIGURE 3), and the annular space thus formed filled with the core material. This assembly was in turn centered in a 4.5 inch x 15 inch shell (3 in FIGURE 3), and the space thus formed filled with the 40% ammonia dynamite. This assembly was tested for complete detonation with the following results:

Table XIV

| d | r [1] | R [1] | Results |
|---|---|---|---|
| 1.6 | 1.22 | 0.79 | + |

[1] r and R are here determined by comparing the sum of the volume or weight of material in the outer shell plus that in the first shell surrounding the core with the sum of the volume or weight of the material in the core plus that in the second shell.

When the outer shell of cap-sensitive explosive was not included, only a poor partial detonation resulted, with what appeared to be substantially all of the insensitive material in the outermost shell being scattered widely over the test area. These tests, plus the cratering tests shown in table XXXIV, indicate that a composite assembly is at least as effective, and possibly more so, than a simple cored assembly when substantially identical ratios of cap-sensitive material to insensitive material are used in both, and the core is always insensitive material while the outermost shell is always cap-sensitive material, and such an assembly is an embodiment of this invention.

EXAMPLE 15

A core explosive was made up containing 91% lead nitrate and 9% anthracite coal. This was used with the 40% ammonia dynamite of Example 1 as the sensitive shell explosive, with the following results:

Table XV

| No. | Core | Shell | d | r | R | Results |
|---|---|---|---|---|---|---|
| a | 3 | 4.5 | 3.36 | 1.25 | 0.37 | − |
| b | 3 | 5 | 3.36 | 1.78 | 0.53 | + |

These results are clearly comparable with the other nitrates tested previously, for instance, Example 2.

EXAMPLE 16

In this example the core explosive was a mixture of 91.2% copper nitrate trihydrate and 8.8% anthracite coal. This was packed into the core at a density of 1.35, and the cap sensitive explosive was the 40% ammonia dynamite of Example 1. The following results were obtained:

Table XVI

| No. | Core | Shell | d | r | R | Results |
|---|---|---|---|---|---|---|
| a | 3 | 5 | 1.35 | 1.78 | 1.33 | − |
| b | 3 | 5.5 | 1.35 | 2.4 | 1.79 | + |

The copper nitrate is less sensitive than the other nitrates tested, but still quite satisfactory.

EXAMPLE 17

In this example the core material was a mixture of 88.4% granular calcium nitrate tetrahydrate and 11.6% bituminous coal, and the cap-sensitive material was the 40% ammonia dynamite of Example 1. The following results were obtained:

Table XVII

| No. | Core | Shell | d | r | R | Results |
|---|---|---|---|---|---|---|
| a | 3 | 4 | 1.335 | 0.78 | 0.59 | − |
| b | 3 | 4.5 | 1.335 | 1.25 | 0.93 | + |

EXAMPLE 18

The material of Example 17 was cast in the cores in this example, and the cap-sensitive explosive was again the ammonia dynamite of Example 1. The following results were obtained:

Table XVIII

| No. | Core | Shell | d | r | R | Results |
|---|---|---|---|---|---|---|
| a | 3 | 3.5 | 1.74 | 0.37 | 0.21 | − |
| b | 3 | 4 | 1.74 | 0.78 | 0.45 | + |

Similar casts made from 92% calcium nitrate tetrahydrate and 8% bituminous coal from 85% calcium nitrate tetrahydrate and 15% bituminous coal were tested and gave identical results. It is noted that the cast material is slightly more sensitive than is the granular material of Example 17.

EXAMPLE 19

In this example the core explosive was a mixture of 66% sodium nitrate and 34% flake aluminum. This was packed into 3 inch cores to a density of 1.21, using a shell of 3.5 or 4 inches in diameter with the 40% ammonia dynamite of Example 1. The following results were obtained:

Table XIX

| No. | Core | Shell | d | r | R | Results |
|---|---|---|---|---|---|---|
| a | 3 | 3.5 | 1.21 | 0.37 | 0.31 | − |
| b | 3 | 4 | 1.21 | 0.78 | 0.69 | + |

The R value here is fully comparable with that of Example 2, showing the flake aluminum is a quite satisfactory fuel.

EXAMPLE 20

A core explosive was prepared containing 83% mill sodium nitrate, 11% anthracite coal and 6% sulfur. This mixture is oxygen balanced to $CO_2$. It was packed in 3 inch diameter cores, using shells of 3.5 or 4 inches in diameter containing the 40% ammonia dynamite of Example 1. The following results were obtained:

Table XX

| No. | Core | Shell | d | r | R | Results |
|---|---|---|---|---|---|---|
| a | 3 | 3.5 | 1.45 | 0.37 | 0.25 | − |
| b | 3 | 4 | 1.45 | 0.78 | 0.54 | + |

The R value is quite satisfactory.

In contrast the above composition could not be detonated even with a 2 lb. cast Pentolite booster when under confinement in a 5 inch steel pipe.

EXAMPLE 21

The following core explosive composition was prepared: 73% mill sodium nitrate, 16% anthracite coal and 11% sulfur. This composition is approximately oxygen balanced for CO, and is similar in proportions to standard sodium nitrate deflagrating black powders. The core explosive composition was used with the 40% cap-sensitive ammonia dynamite of Example 1 as the shell material. The following results were obtained:

Table XXI

| No. | Core | Shell | d | r | R | Results |
|---|---|---|---|---|---|---|
| a | 3 | 3.5 | 1.49 | 0.37 | 0.25 | − |
| b | 3 | 4 | 1.49 | 0.78 | 0.53 | + |

Detonation was readily obtained at a low R value. Like the material of Example 21, this material failed to fire in a 5 inch pipe with a 2 lb. cast Pentolite booster.

Ammonium nitrate-based explosives containing small amounts of fuels or without sensitizers but having a density above about 1.15 can be very difficultly detonatable, or even incapable of detonation. Also, water tends to both cake and densensitize such explosives. Such insensitive or densensitized ammonium nitrate compositions can also be detonated in the explosive cartridges of the invention. The following examples illustrate this.

EXAMPLE 22

An ammonium nitrate core composition was prepared containing 80% ammonium nitrate and 20% urea. The ingredients were heated together at below 100° C. to form a slurry, which was then cast in cores 3 inches in diameter to a density of 1.43. The cores were fitted in shells 3.5 and 4 inches in diameter, which were filled with the 40% ammonia dynamite of Example 1. The results were as follows:

Table XXII

| No. | Core | Shell | d | r | R | Results |
|---|---|---|---|---|---|---|
| a | 3 | 3.5 | 1.43 | 0.37 | 0.26 | − |
| b | 3 | 4 | 1.43 | 0.78 | 0.55 | + |

It is apparent that an ammonium nitrate-based explosive at the extraordinarily high density of 1.43 is readily detonated at a low R value in the cartridges of the invention.

EXAMPLE 23

An ammonium nitrate core explosive was made up of the following composition: 72.3% ammonium nitrate, 20% ammonium sulfamate and 7.7% dicyanodiamide. The ingredients were heated together at below 100° C. to form a slurry, which was cast to a density of 1.39 in 3 inch cores. The cores were fitted in shells 3.5 and 4 inches in diameter, which were filled with the 40% ammonia dynamite of Example 1. The results were as follows:

Table XXIII

| No. | Core | Shell | d | r | R | Results |
|---|---|---|---|---|---|---|
| a | 3 | 3.5 | 1.39 | 0.37 | 0.27 | − |
| b | 3 | 4 | 1.39 | 0.78 | 0.56 | + |

It is apparent that this ammonium nitrate explosive, which is quite insensitive, could be readily detonated in the cartridge of the invention. The 3 inch casts of this example and of Example 22 could not be detonated in a 3 inch pipe with 2 lb. cast Pentolite boosters.

EXAMPLE 24

Mill ammonium nitrate (100%) was packed into cores ranging from 2 to 4 inches in diameter to a density of 0.987. Ammonium nitrate at this density cannot be detonated in columns of less than 5 inches in diameter except under heavy confinement in steel pipe. The cores were packed in shells ranging from 2.5 to 5 inches in diameter, and the shells were then filled with the 40% ammonia dynamite of Example 1. The following results were obtained:

Table XXIV

| No. | Core | Shell | d | r | R | Results |
|---|---|---|---|---|---|---|
| a | 2 | 2.5 | 0.987 | 0.56 | 0.58 | − |
| b | 2 | 2.75 | 0.987 | 0.90 | 0.92 | + |
| c | 3 | 3.5 | 0.987 | 0.37 | 0.38 | − |
| d | 3 | 4 | 0.987 | 0.78 | 0.80 | + |
| e | 4 | 4.5 | 0.987 | 0.26 | 0.27 | + |
| f | 4 | 5 | 0.987 | 0.56 | 0.58 | + |

The results here are particularly striking. It is apparent from the data that 100% mill ammonium nitrate at its normal density is readily detonated in unconfined columns of less than 5 inches in diameter in assemblies according to this invention.

EXAMPLE 25

Uncoated prilled ammonium nitrate (100%) was loaded into cores 3 inches in diameter to a density of 0.855, and the cores fitted into shells 3.5 and 4 inches in diameter, which were then packed with the 40% ammonia dynamite of Example 1.

The results were as follows:

Table XXV

| No. | Core | Shell | d | r | R | Results |
|---|---|---|---|---|---|---|
| a | 3 | 3.5 | 0.855 | 0.37 | 0.44 | − |
| b | 3 | 4 | 0.855 | 0.78 | 0.92 | + |

Uncoated prilled ammonium nitrate (100%), like the mill ammonium nitrate of Example 24, cannot be detonated in columns less than 5 inches in diameter except under heavy confinement. However, it is readily detonated in the cartridges of the invention.

EXAMPLE 26

Cores 3 inches in diameter were packed to a density of 0.96 with coarse Stengel ammonium nitrate (100%) and fitted in shells 4 and 4.5 inches in diameter which were filled with the 40% ammonia dynamite of Example 1. The results were as follows:

Table XXVI

| No. | Core | Shell | d | r | R | Results |
|---|---|---|---|---|---|---|
| a | 3 | 4 | 0.96 | 0.78 | 0.81 | − |
| b | 3 | 4.5 | 0.96 | 1.25 | 0.31 | + |

Here too, it is possible to obtain detonation of 100% ammonium nitrate in unconfined columns of less than 5 inches in diameter.

EXAMPLE 27

An ammonium nitrate core explosive was prepared composed of 93% mill ammonium nitrate and 7% anthracite coal. This composition was filled in cores 2 inches in diameter to a density of 1.035, and fitted into shells 2.5 and 2.75 inches in diameter which were filled with the 40% ammonia dynamite of Example 1. The results were as follows:

Table XXVII

| No. | Core | Shell | d | r | R | Results |
|---|---|---|---|---|---|---|
| a | 2 | 2.5 | 1.035 | 0.56 | 0.55 | − |
| b | 2 | 2.75 | 1.035 | 0.90 | 0.88 | + |

Again, the ammonium nitrate is readily detonated. However, the core material alone could not be detonated in columns of less than 4.5 inches in diameter except under heavy confinement.

EXAMPLE 28

An ammonium nitrate core explosive was prepared, composed of 93% mill ammonium nitrate and 7% bituminous coal. This was filled in 2 inch diameter cores to a density of 1.08 and these fitted in shells 2.25 and 2.5 inches in diameter, which were then filled with the 40% ammonia dynamite of Example 1. The results were as follows:

Table XXVIII

| No. | Core | Shell | d | r | R | Results |
|---|---|---|---|---|---|---|
| a | 2 | 2.25 | 1.08 | 0.26 | 0.25 | − |
| b | 2 | 2.5 | 1.08 | 0.56 | 0.53 | + |

Again, detonation is readily obtained. Unconfined columns of the core material of less than 4.5 inches in diameter could not be detonated.

EXAMPLE 29

An ammonium nitrate core explosive was prepared containing 94.5% mill ammonium nitrate and 5.5% No. 5 oil. This was filled in 2 inch diameter cores to a density of 1.06, and these fitted in shells 2.25 and 2.5 inches in diameter. The shells were packed with the 40% ammonia dynamite of Example 1. The results were as follows:

Table XXIX

| No. | Core | Shell | d | r | R | Results |
|---|---|---|---|---|---|---|
| a | 2 | 2.25 | 1.06 | 0.26 | 0.26 | − |
| b | 2 | 2.5 | 1.06 | 0.56 | 0.55 | + |

Detonation at a low R value was readily obtained. Unconfined columns of the core material of less than 4 inches in diameter could not be detonated.

EXAMPLE 30

Example 24 was repeated using 97.5% mill ammonium nitrate and 2.5% No. 5 oil, packing the cores to a density of 1.055. The following results were obtained:

TABLE XXX

| No. | Core | Shell | d | r | R | Results |
|---|---|---|---|---|---|---|
| a | 2 | 2.25 | 1.055 | 0.26 | 0.26 | − |
| b | 2 | 2.5 | 1.055 | 0.56 | 0.55 | + |

Again detonation is obtained at a low R value. Here again, unconfined columns of the core material of less than 4 inches in diameter could not be detonated.

EXAMPLE 31

An explosive composition was made up composed of 94.5% mill ammonium nitrate and 5.5% No. 5 mineral oil (viscosity approximately 100 SSU at 100° F.). 97.5% of this material and 2.5% water were combined, and packed to densities of 1.17 or 1.22 in 3 inch diameter cores. The sensitive ammonia dynamite of Example 1 was used in the shells. Some of the assemblies were tested before caking, and others following three weeks storage in a field magazine, after which the samples were caked and very hard. The results were as follows:

TABLE XXXI

| No. | Core | Shell | d | r | R | Results |
|---|---|---|---|---|---|---|
| a | 3 | 3.5 | 1.17 | 0.37 | 0.32 | − |
| b | 3 | 4 | 1.17 | 0.78 | 0.67 | + |
| c | 3 | 3.5 | 1.22 | 0.37 | 0.30 | − |
| d | 3 | 4 | 1.22 | 0.78 | 0.64 | + |

The freshly packed (after less than six hours) cores of (a) and (b) alone fired completely with a booster, but a 3 inch core alone (no shell), caked following three weeks of storage, did not fire completely even when using a 2 lb. cast Pentolite booster, although when freshly packed, the same cores fired with ½ lb. cast Pentolite booster.

No. (c) cores above, even when freshly packed (after less than six hours), would not fire with a 2 lb. cast Pentolite booster.

Cans of this core explosive 8 inches in diameter and 21 inches long were packed to a density of 1.17 and stored for three weeks in the magazine, after which time they were caked solid. These cans could not be fired with an 8 inch x 12 inch booster cartridge of the 70% ammonia dynamite used in Example 3, butted against the end thereof or with a 2 lb. cast Pentolite booster embedded in the center of the charge. When packed in such cans to a density of 1.225, this material could not be detonated by a 2 lb. cast Pentolite booster embedded in the charge even after only 5 hours packing.

When freshly packed to a density of 1.17 (after less than six hours), on the other hand, these cans fired completely with a 150 g. cast Pentolite primer inserted into a well at one end of the can, but the explosion did not propagate to a second can butted against the bottom of the first, as is the case when the density of the charge is below 1.15.

A recent development in the art comprises the use of slurried explosives. These slurries, particularly when based on ammonium nitrate and/or other inorganic nitrates normally contain sensitizing agents since otherwise they are too insensitive for any practical application. In the following example the most basic type of slurry was used as a core. This slurry was found to be incapable of detonation in a 5 inch pipe even when a 5 inch x 5 inch cast Pentolite booster was used.

EXAMPLE 32

A cylinder of composition B was cast with internal and external diameters of 3 inches and 3.5 inches respectively and a length of 10 inches. A thin glass tube of 3 inch outside diameter and 12 inches in length so that it extended 2 inches beyond one end of the cast was used as the inner wall. A thin paper shell was used as the outer shell. When the cast had cooled the outer wall was extended 2 inches so that the bottom thereof was even with the bottom end of the glass tube which was then closed with a sheet of rubber sealed thereto with rubber cement. The 2 inch depth of space thus formed between the tube and the outer shell wall was then filled with sand and the entire end of the unit sealed with masking tape. A telltale was inserted through a small hole in the center of the rubber sheet to the extent of 1 inch into the center of the glass tube. The end of this telltale, inside the tube, was sealed with a thin film of rubber cement to prevent entry of liquid. The unit was then inverted and the center tube filled just to the top with mill ammonium nitrate. Water was then added slowly until the liquid level just reached the top of the tube which was then sealed. This unit was fired by means of a 3.5 inch x 3.5 inch cast Pentolite booster. Similar units were then made up using a 3 inch core and 4 inch shell and a 7 inch core and an 8 inch shell. This latter unit had an overall length of 20 inches. These were boostered with 4 inch x 4 inch and 8 inch x 6 inch cast Pentolite boosters, respectively. Results are shown in the following table. The density of the cast composition B was 1.67 and its rate of detonation 7740 m./sec. The freshly prepared core material contained 68.3% ammonium nitrate of which a large portion was solution but a considerable portion was present in the solid form at the bottom of the core. The remaining 31.7% consisted of water.

TABLE XXXII

| No. | Core | Shell | d | r | R | Results |
|---|---|---|---|---|---|---|
| a | 3 | 3.5 | 1.32 | 0.37 | 0.46 | − |
| b | 3 | 4 | 1.32 | 0.78 | 0.99 | + |
| c | 7 | 8 | 1.32 | 0.31 | 0.39 | + |

Units similar to these were prepared except that the core was filled with a concentrated ammonium nitrate solution having a density of 1.27 which contained 58% ammonium nitrate.

TABLE XXXIIa

| No. | Core | Shell | d | r | R | Results |
|---|---|---|---|---|---|---|
| a | 3 | 3.5 | 1.27 | 0.37 | 0.48 | − |
| b | 3 | 4 | 1.27 | 0.78 | 1.01 | + |
| c | 7 | 8 | 1.27 | 0.31 | 0.40 | − |
| d | 6.5 | 8 | 1.27 | 0.52 | 0.67 | + |

EXAMPLE 33

Units were prepared as in Example 32 except that the outer cylinder was cast 50:50 Pentolite having a density of 1.65 and the core material was a saturated solution of sodium nitrate having a density of 1.39 and containing 47% sodium nitrate.

TABLE XXXIII

| No. | Core | Shell | d | r | R | Results |
|---|---|---|---|---|---|---|
| a | 3 | 4 | 1.39 | 0.78 | 0.94 | − |
| b | 3 | 4.5 | 1.39 | 1.25 | 1.50 | + |

In Examples 32 and 33 there is a clear indication that a cylinder of brisant explosive may be lowered into a bore hole full of water, the center filled with ammonium nitrate in situ, and the unit fired satisfactorily even though the slurry core contains no sensitizer and is extremely insensitive. This latter modification, wherein the core should contain a high proportion of nitrate, is thus a modification of the instant invention which is particularly suitable for use in wet bore holes.

These results show that extremely insensitive or desensitized ammonium nitrate compositions not detonatable by conventional means can be detonated in cartridges of this invention.

Practical application of the units of this invention is shown by a train test using 10 units in each case. In these tests the units were of a commercial nature; the core and outer shell were of the same length, and initiation was carried out by means of a cartridge of 40% ammonia dynamite 4 inches in diameter and 6 inches long butted against one end of the train. Such tests were run with the units of Examples 2f, 4b, 7b with complete detonation occurring in all cases.

Cratering tests were carried out on a number of cartridges selected from the examples set forth above. These tests were made because the core materials based on sodium nitrate cannot be detonated in the ballistic pendulum with satisfactory results. In these tests, a cartridge was used containing a 3 inch x 12 inch core, in a 4.5 inch x 15 inch shell of the 40% cap-sensitive explosive of Example 1. The assembly was placed upright in a hole 30 inches deep and 9 inches in diameter. The test holes were all dug in the same clay stratum. The earth was tamped in around and on top of the assemblies to ground level. Detonation was caused by a blasting cap and long fuse, extending upward from the tamped earth stemming. The results obtained are given in the table below:

Table XXXIV

| Core material | Crater dia. in feet | Crater depth in ins. | Crater vol. in cu. ft.[1] | Volume of earth in cu. ft./lb., of assembly (exclusive of booster portion) |
|---|---|---|---|---|
| Sand | 8.75 | 33 | 54.5 | ---------- |
| 40% ammonia dynamite of Ex. 1 | 10 | 41 | 89.5 | 11 |
| Ex. 1 | 9 | 36 | 61.2 | 4.9 |
| Ex. 2 | 9.67 | 40 | 81.4 | 7.7 |
| Ex. 4 | 9.75 | 39.5 | 81.9 | 7.4 |
| Ex. 20 | 9.75 | 41 | 83.8 | 7.7 |
| Ex. 21 | 9.75 | 42 | 86 | 7.9 |
| Ex. 11 | 10.25 | 44 | 101 | 9.4 |
| Ex. 12 | 10.8 | 41 | 104 | 9.9 |
| Ex. 13 | 8.8 | 36.5 | 62.1 | 5.1 |
| Ex. 14 | 10.9 | 41.5 | 107 | 10 |
| Ex. 29 | 10.5 | 46 | 111 | 13 |

[1] The volume is determined by the formula $v\text{-}1.047r^2h$ since the craters were nearly perfect cones except for the bottom 8–10 inches. It is evident that the power of the cartridges of the invention ranges from inferior to distinctly superior to that of 40% ammonia dynamite.

The relative brisance of a number of cartridges selected from the above examples was determined by placing them upright on a steel plate 13/16 inch thick, supported on its four corner by short lengths of 100 lb. railroad iron. The cartridges used had 3 inch x 12 inch cores in 4.5 inch x 5 inch shells of the 40% ammonia dynamite of Example 1. The results obtained were as follows:

Table XXXV

| Core Material | Result of Brisance Test |
|---|---|
| Sand | About a half inch deep depression 4.5–5 inches in diameter was made in the plate. |
| 40% Powder of Example 1. | A 3.5 inch hole was blown completely through the plate. This was bordered by a shear area about 1 inch in width. |
| Example 1 | About ¾ inch deep depression approximately 5 inch in diameter was made in the plate. There were two cracks in the plate one of which extended completely through it. At the center of the bottom of the plate a piece of steel about 1.5 inch in diameter and ⅛ inch thick had flaked off. |
| Example 2 | The plate was broken through at the center with several cracks of 3 to 4 inches in length radiating outward therefrom. |
| Example 4 | Same as Example 2 but with the break-through at the center being a little larger. |
| Example 11 | The plate was broken into several pieces of which five were recovered. It was assumed that the missing portion was all in one piece. The railroad irons were blown at least 10 feet away from the test site. This did not happen in any of the other tests: in all other tests the irons were merely embedded in the earth. |
| Example 24 | The plate was broken in three pieces. |
| Example 29 | A 3.5 inch hole was blown completely through the plate. This was bordered by a shear area about 1 inch in width. |
| Example 29 (4 inch core in 4½ inch shell). | Do. |

The results for Example 29 are to be compared with the results obtained with the ammonium nitrate composition in a 4.5 inch diameter shell and the 40% ammonia dynamite of Example 1 in the core.

Table XXXVI

| Core | Result of Brisance Test |
|---|---|
| 3 inch | About a three inch hole was blown in the plate. |
| 2 inch | About a two inch hole was blown in the plate. |

It is apparent that when the cap-sensitive material is at the core and the insensitive nitrate composition in the shell, the effect of the shot is at least partially dissipated. This shows the significance of putting the insensitive material in the core, and the sensitive material in the shell.

We claim:

1. A detonatable explosive cartridge consisting essentially of a core tube containing an insensitive nitrate-based explosive which includes an inorganic metal nitrate as the principal explosive ingredient, said nitrate-based explosive being insensitive to detonation when filled in 3 inch to 8 inch spiral wound cartridges and detonation thereof is attempted with from 0.5 lb. to 2 lbs. of 50–50 Pentolite booster, said core tube being substantially centered in a shell portion containing a detonatable explosive which, throughout the major length of said core tube, surrounds said core tube, the ratio of the weight of said detonatable explosive to the weight of said insensitive nitrate-based explosive being sufficient to detonate said nitrate-based explosive upon detonation of said detonatable explosive.

2. A detonatable explosive cartridge in accordance with claim 1, in which the core explosive is sodium nitrate.

3. A detonatable explosive cartridge in accordance with claim 1, in which the core explosive is potassium nitrate.

4. A detonatable explosive cartridge in accordance with claim 1, in which the core explosive is in the form of an aqueous slurry.

5. A detonatable explosive cartridge in accordance with claim 1, in which the core explosive includes from about 5 to 10% of a fuel.

6. A detonatable explosive cartridge in accordance with claim 1 in which the detonatable explosive is a cap-sensitive ammonia dynamite.

7. A detonator explosive cartridge in accordance with claim 1 in which the detonatable explosive is cast Pentolite.

8. A detonatable explosive cartridge in accordance with claim 1 in which the detonatable explosive is a mixture of about 60% cyclotrimethylene trinitramine, about 40% trinitrotoluene and from about 1 to 4% wax.

9. A detonatable explosive cartridge in accordance with claim 1, comprising a plurality of concentric layers of insensitive nitrate-based and detonatable explosive, the innermost core portion being insensitive nitrate-based explosive and the outermost shell portion being detonatable explosive.

*10. A detonatable explosive assembly consisting essentially of a core portion of an insensitive nitrate-based explosive as the principal explosive ingredient therein, said nitrate-based explosive being insensitive to detonation when filled in 3 inch to 8 inch spiral wound cartridges and detonation thereof is attempted with from 0.5 lb. to 2 lbs. of 50–50 Pentolite booster, said core portion being positioned in a shell portion of a detonatable explosive which substantially surrounds said core portion, the ratio of the weight of said detonatable explosive to the weight of said insensitive nitrate-based explosive being sufficient to detonate said nitrate-based explosive upon detonation of said detonatable explosive.*

*11. A detonatable explosive assembly in accordance with claim 10, in which the explosive of said core portion includes from about 5% to 10% of a fuel.*

*12. A detonatable explosive assembly in accordance with claim 10, comprising a plurality of alternating layers of said insensitive nitrate-based and detonatable explosives, the innermost core portion being insensitive nitrate-based explosive and the outermost shell portion being detonatable explosive.*

References Cited by the Examiner

The following references, cited by the Examiner, are of record in the patented file of this patent or the original patent.

UNITED STATES PATENTS

| | | | |
|---|---|---|---|
| 2,124,201 | 7/38 | Lewis et al. | 102—24 XR |
| 2,128,576 | 8/38 | White | 102—24 |
| 2,218,563 | 10/40 | Taylor | 102—23 XR |
| 2,398,071 | 4/46 | Barab | 102—22 XR |
| 2,463,709 | 3/49 | McFarland | 102—24 |
| 2,757,611 | 8/56 | Church et al. | 102—24 |
| 2,932,251 | 4/60 | Hamilton | 102—24 |

SAMUEL FEINBERG, *Primary Examiner.*

ARTHUR M. HORTON, BENJAMIN A. BORCHELT, *Examiners.*